UNITED STATES PATENT OFFICE.

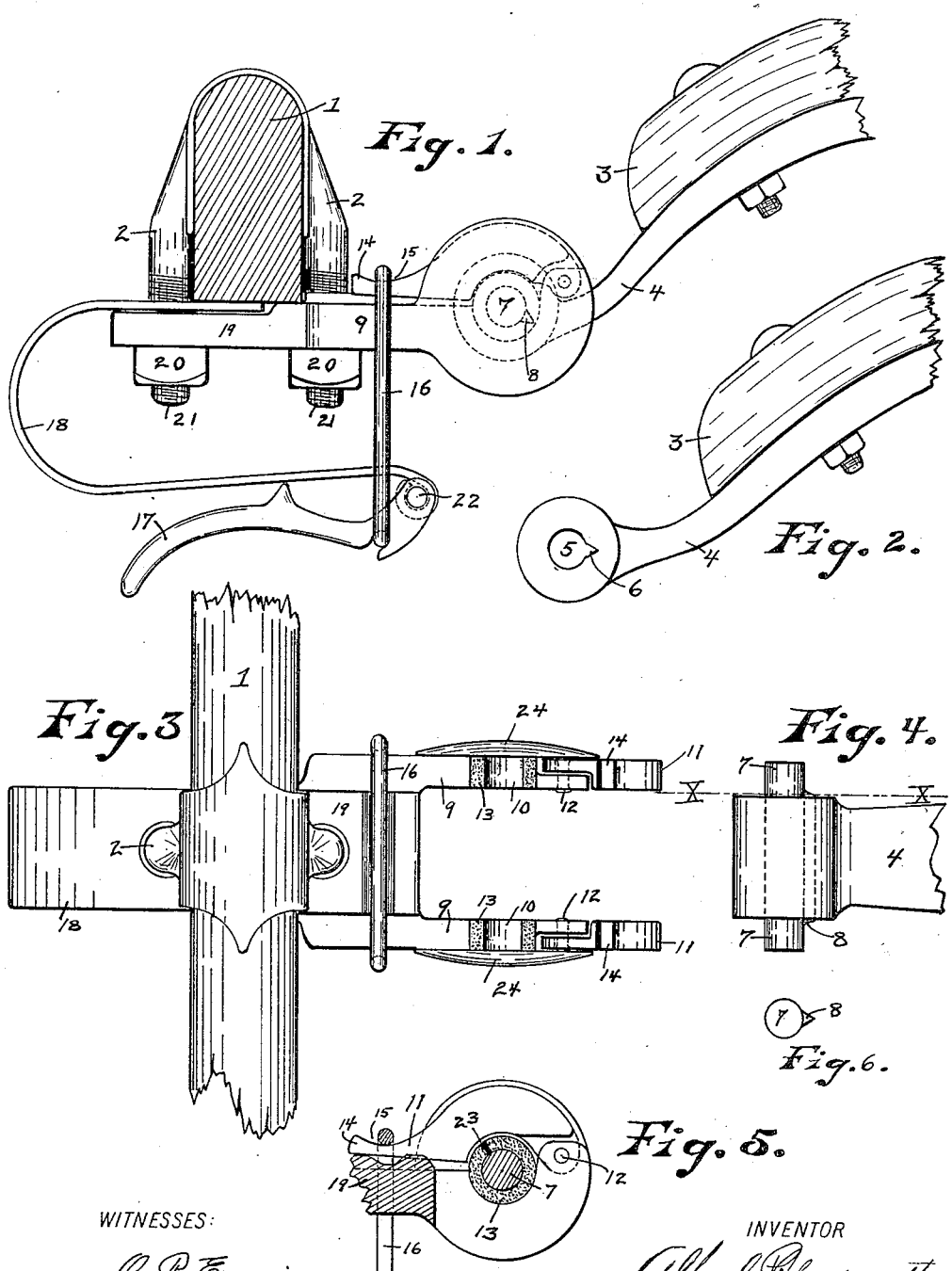

ALFRED PFLUGRADT, OF MILWAUKEE, WISCONSIN, ASSIGNOR TO AMANDA L. PFLUGRADT, OF MILWAUKEE, WISCONSIN.

THILL-COUPLING.

No. 816,597.      Specification of Letters Patent.      Patented April 3, 1906.

Application filed May 18, 1905. Serial No. 260,939.

*To all whom it may concern:*

Be it known that I, ALFRED PFLUGRADT, a citizen of the United States, residing at the city of Milwaukee, county of Milwaukee, and State of Wisconsin, have invented new and useful Improvements in Thill-Couplings, of which the following is a specification.

My invention relates to improvements in thill-couplings.

The object of my invention is, among other things, first, to provide a thill-coupling which is adapted to be used in connection with the ordinary thill by simply inserting a retaining-pin through the eye of the thill-iron, whereby the necessity of removing the old thill-iron or welding new parts to them, as heretofore, is avoided; second, to provide a coupling which will firmly but yieldingly hold leather or similar packings around the retaining-pins of the thill, whereby the liability of the parts becoming loose and rattling is avoided, and, third, to provide a safe efficient coupling for attaching thills provided with ordinary thill-irons to carriage-axles in the most convenient manner.

The construction of my invention is explained by reference to the accompanying drawings, in which—

Figure 1 represents a side view of one of the couplings with the thill-iron attached. Fig. 2 represents a side view of one of the thill-irons of a pair of thills. Fig. 3 represents a top view of one of the thill-couplings with the thill removed. Fig. 4 represents a top view of one of the thills removed from the thill-coupling. Fig. 5 represents an inside view of one of the shaft-supporting arms of the coupling, showing a transverse section of the coupling-pin drawn on line x x of Fig. 4. Fig. 6 represents an end view of the coupling-pin.

Like parts are identified by the same reference-figures throughout the several views.

1 represents the axle of a carriage, to which my improved thill-coupling is attached by clips 2 in the ordinary manner. 3 represents one end of an ordinary thill, and 4 a thill-iron of ordinary construction provided with an eye 5.

Preparatory to attaching the thills to the coupling a V-shaped notch 6 is filed in the eye of the thill-iron and a pin 7 is provided with a V-shaped bead or projection 8, which is adapted to register with and fit into the V-shaped notch 6, formed in the eye, whereby the pin 7 is prevented from turning. The pin is preferably made to closely fit the eye of the thill-iron, whereby when driven in place it will be prevented from turning by the said V-shaped projection and will be held firmly in place by frictional contact with the eye. The fastening-plate 19 is provided with two bifurcated side arms 9 9, in which is formed the semicircular recesses 10 10 for the reception of the protruding ends of the pin 7. To the front ends of the side bearings are pivotally connected the two semicircular clamping-plates 11 11 by the pins 12. 13 13 are packing-rings, which are preferably made of leather or other similar material, which when drawn firmly around the pin 7 will hold it securely in place and prevent it from rattling. The free ends of the semicircular clamping-plates 11 extend rearwardly and are provided with an operating-arm 14, the upper sides of which are provided with a groove or depression 15 for the reception of the fastening-link 16. The link 16 extends downwardly and is connected to the clamping-lever 17. The clamping-lever 17 is pivotally connected with U-shaped springs 18, while the upper ends of said U-shaped springs 18 are clamped between the lower sides of the axle 1 and the fastening-plate 19 of the coupling, said fastening-plate being drawn firmly in place against said spring by turning down the nuts 20 on the threaded ends 21 of the clips 2.

Fig. 1 shows the semicircular clamping-plates in their closed position around the retaining-pin 7 of the thills, and said plates are held yieldingly against the leather packings 13 by the recoil of the spring 18 acting through the clamping-lever 17 and link 16. When, however, it is desirous to remove the thills from the vehicle, the clamping-lever 17 is thrown downwardly in a circular direction until the link 16 is thrown past the lever-retaining pivot 22, whereby the link 16 will be released from the resilient action of the spring 18, when said link 16 may be disengaged from the arms 14, whereby said arms may be thrown forwardly in the position indicated in Fig. 3, when said coupling-pins may be readily withdrawn from the couplings and the thills removed. It will be understood that the upper sides of the leather packings 13 are provided with a slit 23, which will permit them to separate and the pin 7 to be readily withdrawn therefrom. When the thills are replaced, it is necessary simply to throw the clamping-plates 11 back into their normal position, (shown in Fig. 1,) when they will be drawn down firmly against the leather packings by throwing the clamping-lever 17 back into its normal position. (Indicated in said Fig. 1.) When using my thill-coupling with new vehicles, it is obvious that the coupling-pin 7 may be formed integral with the thill-iron. When, however, it is desirous to attach old thill-irons of the ordinary construction, like that shown in Fig. 2, it is necessary simply to file a notch 6 in the side of the thill-eye 5 and to provide the thill-coupling pin 7 with a V-shaped projection 8, as previously stated, when said parts, which are made to closely fit each other, are secured firmly together. The bifurcated arms 9 9 are respectively provided with circular side disks 24 24, which are attached to or formed integrally with the vertical sides of said side arms and extending forwardly past the semicircular recesses 10 10 and serve to cover up the joint between the walls of said recess and the coupling-pin 7, while they also cover the sides of the joint formed between the side arms 9 9 and the clamping-plates 11, as indicated in Fig. 3, said plates serving not only to give the coupling a neat and finished appearance, but also to prevent the sand and dust from entering the bearings between the coupling-pin and the packings, while they also protect the joint between the clamping-plates 11 and the side arms, with which they are pivotally connected.

Having thus described my invention, what I claim as new, and desire to secure by Letters Patent, is—

In a thill-coupling, the combination of a bifurcated fastening-plate, the forked ends of which are provided with semicircular recesses for the reception of the coupling-pins of a thill-iron; a pair of clamping-plates pivotally connected at one of their ends with the forked ends of the fastening-plate and provided with semicircular recesses adapted to register with the recesses of the fastening-plate; annular packings located in said semicircular recesses; a thill-iron provided with an eye for the reception of a coupling-pin; a coupling-pin secured at its center in said eye and having its protruding ends located in said packings, a spring rigidly connected at one end with the fastening-plate; a clamping-lever pivotally connected at one end with said spring and a link communicating between the clamping-lever and said clamping-plates, all substantially as and for the purpose specified.

In testimony whereof I affix my signature in the presence of two witnesses.

ALFRED PFLUGRADT.

Witnesses:
   Jas. B. Erwin,
   Emma Mueller.